(12) United States Patent
Baumann

(10) Patent No.: US 8,540,210 B2
(45) Date of Patent: Sep. 24, 2013

(54) LOW FRICTION AND GRADUALLY OPENING BUTTERFLY VALVE VANE

(76) Inventor: Hans D Baumann, W. Palm Beach, FL (US)

( * ) Notice: Subject to any disclaimer, the term of this patent is extended or adjusted under 35 U.S.C. 154(b) by 0 days.

(21) Appl. No.: 13/507,225

(22) Filed: Jun. 14, 2012

(65) Prior Publication Data

US 2012/0256112 A1 Oct. 11, 2012

(51) Int. Cl.
*F16K 1/226* (2006.01)
(52) U.S. Cl.
USPC .......................... 251/121; 251/305
(58) Field of Classification Search
USPC .................. 251/120–121, 305–308
See application file for complete search history.

(56) References Cited

U.S. PATENT DOCUMENTS

| | | | | |
|---|---|---|---|---|
| 2,271,340 A | 1/1942 | Dodson | | 251/305 |
| 2,278,421 A | 4/1942 | Brown | | 236/34 |
| 3,960,177 A * | 6/1976 | Baumann | | 251/121 |
| 4,296,915 A * | 10/1981 | Baumann | | 251/306 |
| 4,469,305 A | 9/1984 | Baumann | | 251/305 |
| 4,480,815 A * | 11/1984 | Kreij | | 251/306 |
| 4,489,917 A * | 12/1984 | Baumann | | 251/305 |
| 4,770,393 A * | 9/1988 | Hubertson | | 251/306 |
| 5,794,591 A * | 8/1998 | Kalebjian et al. | | 123/337 |
| 6,604,516 B1 * | 8/2003 | Krimmer et al. | | 251/306 |
| 6,726,176 B2 | 4/2004 | Bauman | | 251/305 |
| 7,089,958 B2 * | 8/2006 | Schlosser et al. | | 251/305 |
| 7,114,486 B2 * | 10/2006 | Hannewald et al. | | 251/305 |

FOREIGN PATENT DOCUMENTS

DE 2430821 * 1/1976

* cited by examiner

*Primary Examiner* — John Bastianelli

(57) ABSTRACT

The invention relates to vanes used in butterfly valves utilized in fluid control systems requiring special relationships between passing fluid and vane rotation and furthermore can provide leak proof shut-off when in the closed valve position and due to the extended contact length between the vane and the valve bore assures low opening friction. The invention furthermore features a shape that greatly reduces the customary high dynamic torque created by fluid suction effects on a vane when in the open position.

6 Claims, 2 Drawing Sheets

LOW FRICTION AND GRADUALLY OPENING BUTTERFLY VALVE VANE

There are no prior non-provisional applications and no international applications designating the U.S.

BACKGROUND OF THE INVENTION

The invention describes an angle-seating vane typically employed as shut-off or fluid throttling device in a butterfly valve. Butterfly valves of this kind usually employ flat and axis symmetric vanes to provide shut-off when squeezed into a vertical position perpendicular to the axis of the valve passage for example, if the valve passage is lined with an elastomer. Such vanes have a slightly larger diameter than that of the passage causing some of the elastomeric liner to be displaced. Such a system works well for valves only requiring on-off service but are not practical for throttling or modulating service, since the diametrical interference produces substantial friction resulting in a jerky action tending to upset a smooth fluid control.

Furthermore, repeated closures can lead to abrasive wear of the liner causing eventual leakage. Finally, flat butterfly disks or vanes are subject to substantial dynamic torque due to the suction effect imposed by the fluid on that portion of the vane facing downstream. Such high torque can lead to instability and requires strong and costly actuating devices to overcome.

My invention overcomes these and other objections by providing a vane which does not rely on diametric interference between vane and liner. This is accomplished by assuring shut-off through gentle touching of the liner by the outer rim of my vane at an angle whose tangent is larger than the coefficient of friction between the metal vane and the elastomer liner material, or a metal surface, thus assuring a gentle opening action.

Furthermore, my vane has a cup-shaped opening on the half portion facing downstream. This breaks up any suction effect by the passing fluid assuring a greatly diminished hydraulic torque effect.

The flat outer rim around a portion of the circumference provides a gripping surface, in order to facilitate a turning by a lathe or other machinery in order to machine a required precise diameter of my vane when in a tilted position.

This design is especially suitable for applications in the bioprocess industries requiring a germ-free environment. This is possible since this vane has no opening for the collection of germs or impurities (except for the shaft passage, which is sealed on either end).

Another advantage over current state of the art is the fact that the invented vane has a much more gradual opening flow characteristic. This vane has an elongated contact area with the valve's passage ending about 15 to 25 degrees from the vertical axis. Any 10 degree turn from the closed position will yield a flow area proportional to 1−cosine (10 degrees)=0.015 times the radius of the valve's passage. In contrast, conventional angle seating vanes have a contact angle of 15 degrees. In this case, a 10 degree turn will produce a gap proportional to 1−cosine (10+15)=0.09 times the radius of the passage. This is a 6 times improvement over the prior art.

There are a number of prior art patents, having vanes in order to reduce dynamic operating torque; Examples are U.S. Pat. No. 2,271,390 by Dodson and German patent 2430821. While patent 2430821 lacks the improved flow characteristic and machinability feature of the present invention, Dodson's vane has an excessive cross-section in order to provide a special dynamic profile. This limits the flowcapacity of his device severely. Furthermore, his gradual increase is compromised with an opening angle of 15 degrees. Brown, U.S. Pat. No. 2,278,421 has similar problems since one-half of his vane seats at about 45 degrees, which makes for an even more rapid opening.

U.S. Pat. No. 6,726,176 shows a more modern version of a tight shut-off butterfly valve employing a double eccentric vane. Here a desirable characteristic is achieved by utilizing a contoured portion as part of the vane and in the valve housing itself. Such solutions are impossible in lined or sanitary butterfly valves. The same patent also shows a cupped recess, in order to reduce dynamic torque (see FIG. 5). Its effectiveness is limited by the near flat surfaces between the upper and lower seats. In my invention, the fluid is guided into a recess by the upper half which is tilted downstream. Finally, this referenced invention lacks the machinability feature provided in my current invention by the upper and lower rims.

DETAILED DESCRIPTION

Figure 1:
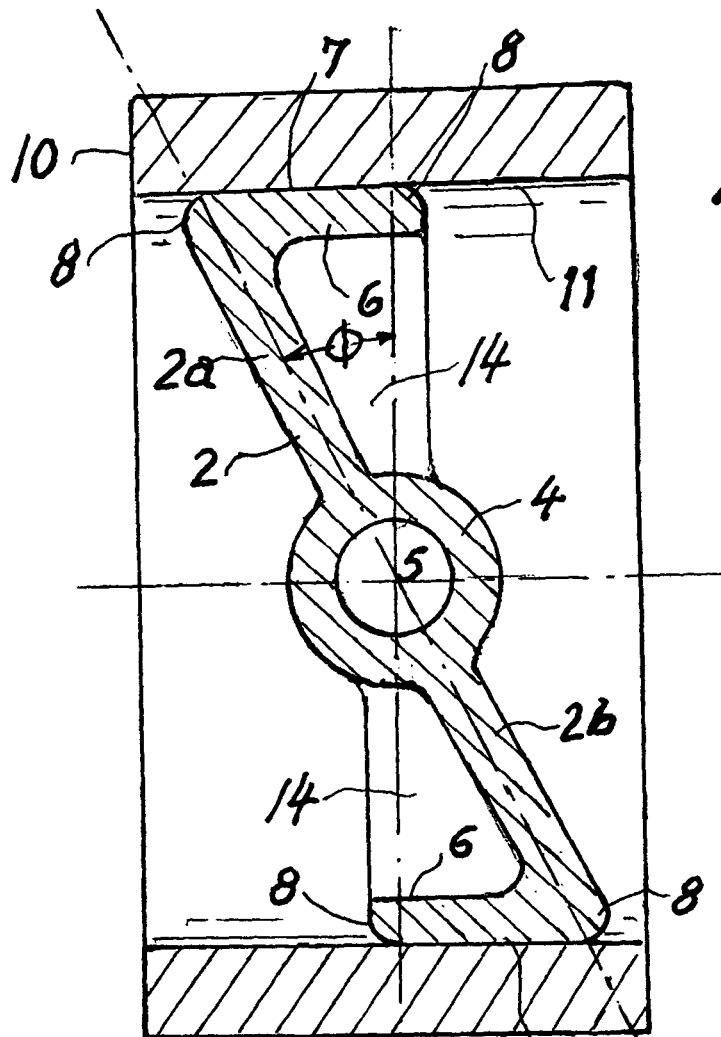
FIG. 1 is a cross-sectional view of a preferred embodiment of my invention shown in a closed position inside a butterfly valve.

Referring to FIG. 1, where a preferred version of my vane 2 is illustrated, it is comprised of a central hub 4 straddling an upper disk 2a and a lower disk 2b, both extending along a tilted axis 13 and being connected to a rim 6 extending along a substantial portion of the circumference of my vane. The horizontal length of this rim extends above the thickness of said disks. Its length diminishes from the top of the vane to said hub. Said rim comprises a flat section 7 capable of hugging the inside surface 11 of a butterfly valve passage 10, when in the closed valve position. Said flattened portion 7 terminates on either end in radii 8.

The length of each flattened section is given by the distance between the intersection of a vertical axis 12 passing through the center of a bore 5 and the intersection with a tilted axis 13, likewise passing through the center of said bore 5 capable to receive a shaft used to rotate said vane. The angular displacement between axis 12 and 13 varies typically between 15 and 25 degrees.

Figure 2:
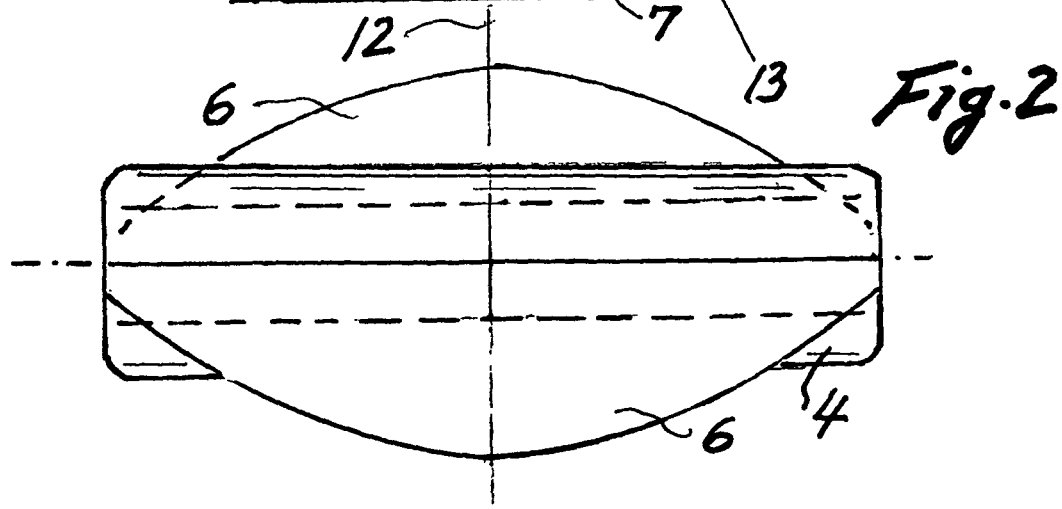
FIG. 2 is a top view of the embodiment shown in FIG. 1.

FIG. 2, showing the embodiment when viewed from the top exemplifies the gradual diminishing length of both rim halves from their extremities as shown in FIG. 1 and finally terminating at hub 4.

As further shown in FIG. 1, recesses 14 are formed between the intersections of disks 2a and 2b and rims 6 to provide impingement of fluid, when the valve is open in order to counteract adverse fluid velocity-induced torsional forces on the vane. By arranging the recesses in a bi-directional manner, one can accommodate fluid entering such a valve from either direction.

Figure 3:
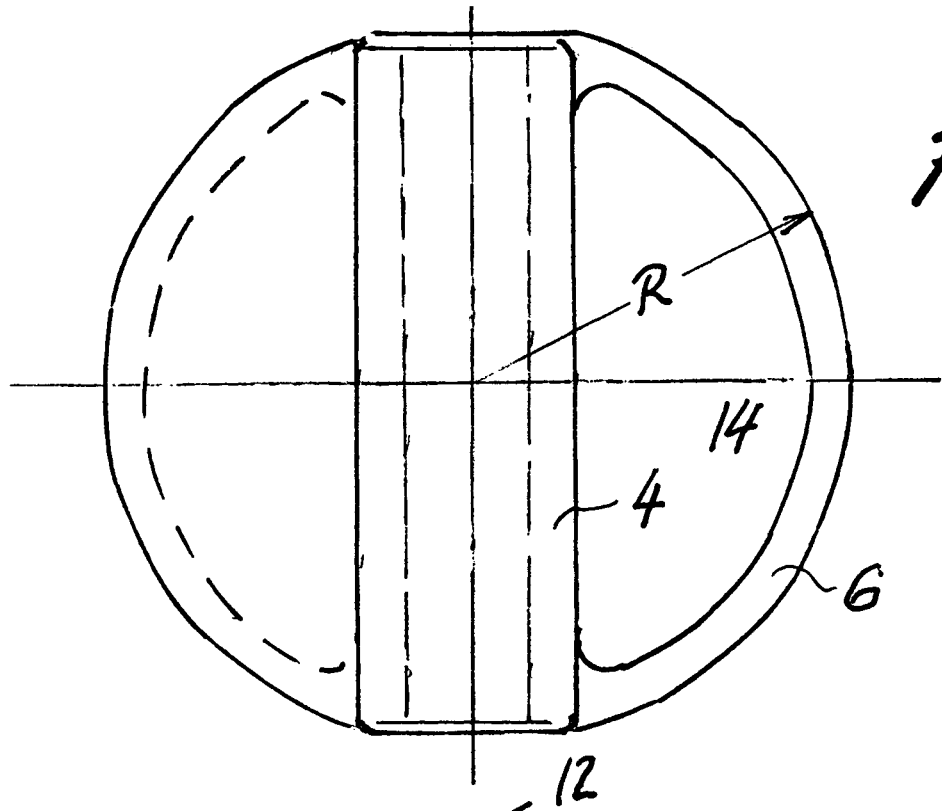
FIG. 3 is a planary view of the preferred embodiment of FIG. 1.

FIG. 3 exemplifies a planary view of the embodiment in FIG. 1 along a central, horizontal axis of the butterfly bore. As shown in FIGS. 2 and 3, bore 5 extends perpendicular to axes 12 and 13 and is in line with the planary surfaces of disk portions 2a and 2b.

Figure 4:
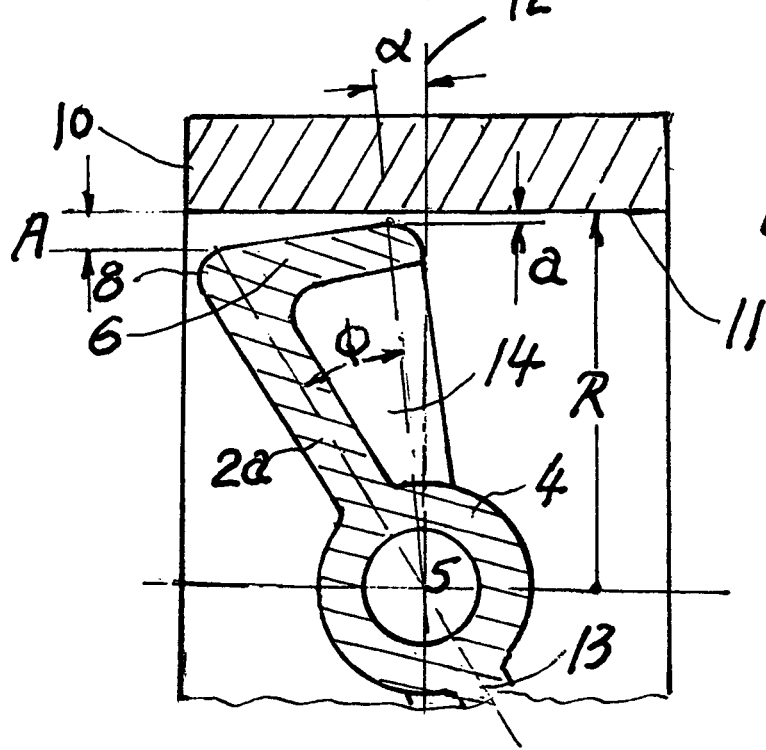
FIG. 4 is a cross-sectional view of the upper portion of the embodiment in the partial open position inside a butterfly valve.

FIG. 4 illustrates the gradual opening and low friction characteristics of the invention. Here the vane illustrated in the partial open position after having been rotated at an angle α, assumed to be 10 degrees. The friction between the radius 8 at the termination of disk portion 2a determines the opening torque of the vane when a is near zero, this friction coefficient is equivalent to tan Φ; in this case 0.36, which is above typical friction coefficients of metal against metal, or against elastomers. This prevents self-locking between the vane and the internal surface of the valve bore, typical with conventional butterfly valves which require considerable force to brake the vane loose.

Returning now to FIG. 4, the example will show the gradual opening characteristic of my vane. Here a radial distance A, defining a flow area without the rim 6, is compared with the distance a with aid of the rim. Here a is given by $(1-\cos \alpha) \times R$. With α=10 degrees calculates to be 0.015 R. Distance A is likewise given as $(1-\cos \Phi) \times R$. This calculates to 0.06 R (with Φ being 20 degrees), a four times larger flow area, typically yielding a liner flow vs. travel characteristic. Using the rim, on the other hand, generates a geometric progression between flow and travel, much preferred for process control.

While my invention has been demonstrated in a preferred embodiment, nothing shall preclude from making additional modifications without departing from the scope of the following claims. For example, it is anticipated, that my vane can just as well be used in conjunction with a butterfly valve having an elastomeric lined bore. Furthermore, my vane could be enveloped into a corrosion resisting plastic such as Teflon®. Finally, it is anticipated that it might be advantageous at times, to place both of the fluid impinging recesses on one side of the vane instead on both sides as here illustrated.

The invention claimed is:

1. A low friction and gradually opening butterfly valve vane comprising a tilted disk having an upper half 2a and a lower half 2b separated by a central hub 4 dissecting said vane, said hub having a central bore 5 to accommodate a shaft, each disk portion having a horizontal rim 6 extending beyond the thickness of the disks and comprising a flattened portion 7 and two rounded edges 8 along most of the outer circumference of said vane, and wherein the horizontal length of said rims diminish along the circumference of the vane starting from the top of the vane towards the hub and likewise from the bottom of the vane towards the hub and wherein the maximum length of the flattened section 7 of each of the rims 6 extends from the intersection of said flattened portions with an axis 13 centering the tilted vane to a vertical axis 12, both axes passing through the center of bore 5, and both flattened rim portions 7 are configured to engage a surface 11 of a butterfly valve passage 10, when the vane is in the closed valve position, and wherein at least one disk portion together with an extended portion of said rim forming a recess 14 capable to impinge fluid flowing through the valve passage when the valve is in the open position.

2. A low friction and gradually opening butterfly valve vane as in claim 1, wherein the angular displacement between the axis 13 centering the tilted disks and said vertical axis 12 is between 15 and 25 degrees.

3. A low friction and gradually opening butterfly valve vane as in claim 1, wherein the vane is capable to be installed within the passage of the butterfly valve and being able to open said passage when rotated to a position between 15 and 25 degrees from the horizontal axis of said valve passage.

4. A low friction and gradually opening butterfly valve vane as in claim 1, wherein said vane is capable to be installed inside the passage of the butterfly valve and able to close the circular passage of said valve when rotated to a position within 85 degrees of the axis of the circular passage.

5. A low friction and gradually opening butterfly valve vane as in claim 1, wherein the external circumferential surface of said vane is parallel with the internal surface of the butterfly passage, when the vane is in the closed position.

6. A low friction and gradually opening butterfly valve vane as in claim 1, wherein the bore passing said hub is aligned with the center of the butterfly valve bore.

* * * * *